Patented Aug. 14, 1934

1,969,741

UNITED STATES PATENT OFFICE 1,969,741

ETHANOLAMINE SALT OF CELLULOSE ESTERS CONTAINING DICARBOXYLIC ACID RADICALS AND ITS PREPARATION

Charles R. Fordyce, Rochester, N. Y., assignor to Eastman Kodak Company, Rochester, N. Y., a corporation of New York No Drawing. Application September 12, 1932, Serial No. 632,793

16 Claims. (Cl. 260—101)

The present invention relates to the salts of the cellulose esters containing a dicarboxylic acid radical formed by neutralizing one of the carboxyl groups of the radical with an ethanolamine, especially triethanolamine.

In U. S. application Serial No. 380,252 of Messrs. C. J. Malm and C. E. Waring there is disclosed and claimed a process of making dicarboxylic acid esters of cellulose by reacting upon cellulose or an esterifiable cellulose acetate with a dicarboxylic acid anhydride such as phthalic anhydride in the presence of an organic base such as pyridine, quinoline or the like. The resulting product in that case is then washed with dilute acid to remove substantially all the pyridine or other base therefrom and a dicarboxylic acid ester of cellulose results, in which each of the dicarboxylic acid radicals presents one free, unesterified carboxyl group. That application also describes the preparation of water-soluble derivatives by neutralizing the unesterified carboxyl groups of the dicarboxylic acid radicals with an alkali metal hydroxide. Although the preparation of water-soluble salts of the dicarboxylic acid esters of cellulose by that method is very satisfactory in the hands of a skilled operator, the carrying out of that process may present technical difficulties due to the ever-present danger in the presence of mineral alkalies of saponification of the acyl groups from the cellulose derivative.

One object of my invention is to prepare a water-soluble, organic salt of a cellulose ester containing a dicarboxylic acid radical. Another object of my invention is to prepare a water-soluble derivative of cellulose containing no metallic constituents. Other objects will hereinafter appear.

I have found that ethanolamine salts of dicarboxylic acid esters of cellulose may be prepared by treating a solution of the ester with a solution of an ethanolamine. I have found that the ethanolamine salts formed by this present process are eminently suited in solution in the appropriate solvent, such as methyl alcohol, water or their mixture, as a carrier for dyes which are soluble therein.

The following examples illustrate the preparation of ethanolamine salts of dicarboxylic esters of cellulose in accordance with my invention:

Example I 50 lbs. of a cellulose acetate phthalate having a 37% phthalyl content was dissolved in 400 lbs. of acetone. This solution was poured with stirring into a solution of 100 lbs. of thiethanolamine in 500 lbs. of acetone. The cellulose acetate triethanolamine phthalate formed, precipitated out and this precipitate was filtered off, washing a number of times with acetone and dried at about 50° C. The product was found to be soluble in water, methyl alcohol, ethylene glycol monomethyl ether, methanol-acetone (2–4:1) and ethylene glycol monoacetate. It was also found to be soluble in the following plasticizers at 200° C.: methyl phthalate and tributyl phosphate. The latter plasticizer does not separate out from the cellulose acetate triethanolamine phthalate upon restoring the whole to room temperature so that compositions of matter comprising these two ingredients are eminently suited for use as molding compositions.

Example II

A solution of 50 lbs. of cellulose acetate succinate, having a succinyl content of approximately 33%, in 400 lbs. of acetone was poured with stirring into a solution of 100 lbs. of triethanolamine and 500 lbs. of acetone. The cellulose acetate triethanolamine succinate formed, precipitated from solution and after thorough agitation was filtered off, washed with acetone until free from uncombined triethanolamine, and dried at 50° C. The product showed solubilities similar to those of the cellulose acetate triethanolamine phthalate formed in the preceding example.

Example III

A solution was prepared by dissolving 50 lbs. of cellulose phthalate in a mixture of 150 lbs. of acetone and 50 lbs. of methyl alcohol. This solution was added with stirring to a mixture of 100 lbs. of triethanolamine and 500 lbs. of acetone. The cellulose triethanolamine phthalate formed, precipitated from solution and was filtered off and washed with acetone until it was free from uncombined triethanolamine. It was then dried at 50° C. The product obtained was very readily soluble in water.

Any of the dicarboxylic acid esters of cellulose including cellulose acetate phthalate, cellulose phthalate, cellulose succinate, cellulose acetate succinate, cellulose acetate diglycollate, cellulose acetate propionate phthalate and the like in which one of the carboxyl groups of the dicarboxylic acid radical is free and unesterified may be employed as the starting material to prepare ethanolamine salts in accordance with the present invention. Also any of the ethanolamines including monoethanolamie and diethanolamine are suitable to form salts which are water-soluble according to the present invention.

As was pointed out above in connection with the triethanolamine salts, they may be employed for the application of a water-soluble dye to various surfaces. In the photographic industry the problem of taking photographs of scenes involving "high lights" or light of more than ordinary intensity has often presented itself. For instance bright lights will give, instead of a clear image upon the negative, a sort of fuzzy halo effect. This action of "high lights" on photographic film is known as "halation" and is due to reflection of light from the back side of the film. At the present time in order to overcome this halation a water soluble colored backing (preferably black) is applied to the back of the film to subdue or eliminate this reflection which backing is dissolved off by the developer in the developing of the negative film. These ethanolamine salts being water soluble are valuable in solution with a compatible and suitable dye for the application of this colored layer or "antihalation backing" to the back side of a photographic film. Suitable dyes and a further description of the application of such coatings is described and more generically claimed in Hickman, application Ser. No. 528,266 and Malm, application Ser. No. 594,261. The use of colored cellulose derivative coatings which are water soluble will also be suggested to those interested in other arts.

Additional uses of such ethanolamine cellulose derivative salts are as non-abrasive or protective coatings for the back or the emulsion sides of photographic negatives wherein, for instance, I apply an uncolored coating of one of these salts as a thin layer to protect the photographic film against abrasion or other injury. In addition suitable light filtering dyes may be incorporated in overcoatings for negatives to filter out predetermined bands of the spectrum. These layers being water soluble are, of course, readily removable during development of the film.

The organic salts prepared according to our invention may be coated out from their solution in methyl alcohol or other suitable solvents to form transparent sheets or skins which obviously will be water-soluble, that property suggesting the use of such skins, especially in instances where the coating is to be dissolved away by water or aqueous solutions.

Some of the ethanolamine salts of dicarboxylic acid esters of cellulose which may be prepared according to my invention by employing the proper reagents are:

Cellulose triethanolamine phthalate.
Cellulose acetate triethanolamine phthalate.
Cellulose triethanolamine succinate.
Cellulose acetate triethanolamine succinate.
Cellulose triethanolamine diglycollate.
Cellulose diethanolamine phthalate.
Cellulose monoethanolamine phthalate.
Cellulose acetate diethanolamine succinate.
Cellulose acetate propionate triethanolamine phthalate.

The following is an illustration of the applicability of these salts as a backing for photographic film:

A 5% solution of a cellulose acetate triethanolamine phthalate in a solvent comprising a mixture of water and methyl alcohol in equal volumes was prepared. A small amount of a water soluble dye such as dianil blue R (color index No. 390) was then added to the solution and a piece of cellulose acetate film about 3 in. wide was drawn through it. The film was dried at about 100° C. for 5 to 15 minutes and found to have a uniform colored overcoating thereon. The film was then placed in a beaker of distilled water and the colored overcoat was dissolved almost immediately from the colorless cellulose acetate support, showing that upon the development of photographic film containing a backing of a cellulose acetate triethanolamine phthalate carrying a water-soluble dye, this backing layer will all dissolve away so that it will be absent from the finished negative.

It is to be understood that a protective covering or an anti-halation backing of an ethanolamine salt of dicarboxylic acid ester of cellulose may be applied to any film or sheet comprising a cellulose derivative whether of cellulose acetate, cellulose nitrate, a cellulose ether, a mixed organic ester of cellulose such as cellulose acetate propionate etc. It is of course apparent that if the film or sheet were of a water-soluble derivative there would however be many technical difficulties arise which would make the application of such a backing impractical although operative with that type of film.

Various modifications of my invention apparent to those skilled in the art upon inspection of the above disclosure are also to be understood as included within the scope of my invention as defined by the appended claims.

I claim as my invention:

1. An ethanolamine salt of a cellulose ester containing a dicarboxylic acid radical.
2. The triethanolamine salt of a cellulose ester containing a dicarboxylic acid radical.
3. An ethanolamine salt of a mixed ester of cellulose containing a dicarboxylic acid radical.
4. A triethanolamine salt of a mixed ester of cellulose containing a dicarboxylic acid radical.
5. An ethanolamine salt of a cellulose phthalate.
6. An ethanolamine salt of a cellulose acetate phthalate.
7. A cellulose triethanolamine phthalate.
8. Cellulose acetate triethanolamine phthalate.
9. Cellulose acetate triethanolamine succinate.
10. Cellulose acetate triethanolamine dicarboxylate.
11. The process of preparing a cellulose ethanolamine dicarboxylate which comprises reacting upon a cellulose ester containing a dicarboxylic acid radical with an ethanolamine.
12. The process of preparing a cellulose ethanolamine dicarboxylate which comprises reacting upon a cellulose ester containing a dicarboxylic acid radical with an ethanolamine in solution.
13. The process of preparing a cellulose triethanolamine dicarboxylate which comprises reacting upon a cellulose ester containing a dicarboxylic acid radical with a triethanolamine.
14. The process of preparing a cellulose triethanolamine dicarboxylate which comprises reacting upon a cellulose ester containing a dicarboxylic acid radical with a triethanolamine in solution.
15. The process of preparing a cellulose triethanolamine phthalate which comprises reacting upon a cellulose phthalate with triethanolamine.
16. The process of preparing cellulose acetate triethanolamine phthalate which comprises reacting upon a cellulose acetate phthalate with triethanolamine.

CHARLES R. FORDYCE.